US006501735B1

United States Patent
Han

(10) Patent No.: US 6,501,735 B1
(45) Date of Patent: Dec. 31, 2002

(54) SELF-DIAGNOSTIC METHOD FOR DETECTING FAULTS IN A TRANSCEIVER WITHIN A WIRELESS RECEIVING UNIT OF A BASE TRANSCEIVER STATION

(75) Inventor: Deog-su Han, Seoul (KR)

(73) Assignee: Samsung Electronics Co., Ltd., Kyungki-Do (KR)

( * ) Notice: Subject to any disclaimer, the term of this patent is extended or adjusted under 35 U.S.C. 154(b) by 0 days.

(21) Appl. No.: 09/332,658

(22) Filed: Jun. 14, 1999

(30) Foreign Application Priority Data

Jun. 15, 1998 (KR) .......................................... 98-022291

(51) Int. Cl.[7] .............................................. G01R 31/08
(52) U.S. Cl. ........................................ 370/242; 714/100
(58) Field of Search ................................. 370/216, 241, 370/242; 455/425, 507, 424, 517; 714/100, 2, 25, 48, 47, 499, 699, 799

(56) References Cited

U.S. PATENT DOCUMENTS

| | | | |
|---|---|---|---|
| 5,706,333 A | * | 1/1998 | Grenning et al. .............. 379/59 |
| 5,838,900 A | * | 11/1998 | Horvath et al. ........ 395/185.09 |
| 6,094,577 A | * | 7/2000 | Han ............................ 455/424 |
| 6,128,555 A | * | 10/2000 | Hanson et al. ................. 701/13 |

* cited by examiner

Primary Examiner—Wellington Chin
Assistant Examiner—Brenda Pham
(74) Attorney, Agent, or Firm—Steve Cha; Cha & Reiter

(57) ABSTRACT

A method and apparatus are disclosed for detecting a fault in a transceiver of a base transceiver system. In the transceiver having a down converter, a microprocessor reads a predetermined first minimum value and a predetermined first maximum value of received input signal levels, measures an instantaneous control voltage generated from an automatic gain controller (AGC) and converts the measured instantaneous AGC control voltage into a received input signal level. When the converted received input signal level is below the predetermined first minimum value, the microprocessor determines that a fault exists in the amplifier operation of the down converter. Similarly, when the received input signal level exceeds the predetermined first maximum value, the microprocessor determines that a fault exists in the amplifier operation of the down converter. On the other hand, when the converted received input signal level stays between the predetermined first maximum and the predetermined first minimum values of the received input signal levels, the microprocessor reads a predetermined second minimum value and a predetermined second maximum value of intermediate frequency (IF) detection voltage values, and also reads an instantaneous IF detection voltage, which is measured by the AGC. When the instantaneous IF detection voltage is below the predetermined second minimum value of the IF detection voltage value, the microprocessor determines that a fault exists in the AGC operation of the down converter, and when the IF detection voltage exceeds the predetermined second maximum value of the IF detection voltage value, the microprocessor determines that a fault exists in the AGC operation of the down converter.

19 Claims, 8 Drawing Sheets

| AGC CONTROL VOLTAGE | INPUT LEVEL | AGC CONTROL VOLTAGE | INPUT LEVEL | AGC CONTROL VOLTAGE | INPUT LEVEL | AGC CONTROL VOLTAGE | INPUT LEVEL |
|---|---|---|---|---|---|---|---|
| 47 | -40.0 | 98 | -55.7 | 149 | -71.5 | 200 | -87.0 |
| 48 | -40.5 | 99 | -56.0 | 150 | -71.7 | 201 | -87.2 |
| 49 | -40.7 | 100 | -56.5 | 151 | -72.0 | 202 | -87.5 |
| 50 | -41.0 | 101 | -56.7 | 152 | -72.5 | 203 | -87.7 |
| 51 | -41.2 | 102 | -57.0 | 153 | -72.7 | 204 | -88.0 |
| 52 | -41.5 | 103 | -57.2 | 154 | -73.0 | 205 | -88.5 |
| 53 | -41.7 | 104 | -57.5 | 155 | -73.5 | 206 | -88.7 |
| 54 | -42.0 | 105 | -58.0 | 156 | -73.7 | 207 | -89.0 |
| 55 | -42.5 | 106 | -58.2 | 157 | -74.0 | 208 | -89.5 |
| 56 | -42.7 | 107 | -58.5 | 158 | -74.5 | 209 | -89.7 |
| 57 | -43.0 | 108 | -59.0 | 159 | -75.0 | 210 | -90.0 |
| 58 | -43.5 | 109 | -59.2 | 160 | -75.2 | 211 | -90.2 |
| 59 | -43.7 | 110 | -59.5 | 161 | -75.5 | 212 | -90.5 |
| 60 | -44.0 | 111 | -60.0 | 162 | -75.7 | 213 | -90.7 |
| 61 | -44.2 | 112 | -60.5 | 163 | -76.0 | 214 | -91.0 |
| 62 | -44.5 | 113 | -60.7 | 164 | -76.2 | 215 | -91.2 |
| 63 | -45.2 | 114 | -61.0 | 165 | -76.5 | 216 | -91.5 |
| 64 | -45.5 | 115 | -61.5 | 166 | -77.0 | 217 | -91.7 |
| 65 | -45.7 | 116 | -61.7 | 167 | -77.2 | 218 | -92.0 |
| 66 | -46.0 | 117 | -62.0 | 168 | -77.5 | 219 | -92.5 |
| 67 | -46.5 | 118 | -62.5 | 169 | -77.7 | 220 | -92.7 |
| 68 | -46.7 | 119 | -62.7 | 170 | -78.0 | 221 | -93.0 |
| 69 | -47.0 | 120 | -63.0 | 171 | -78.2 | 222 | -93.2 |
| 70 | -47.5 | 121 | -63.2 | 172 | -78.5 | 223 | -93.5 |
| 71 | -48.0 | 122 | -63.5 | 173 | -78.7 | 224 | -94.0 |
| 72 | -48.2 | 123 | -64.0 | 174 | -79.0 | 225 | -94.1 |

| AGC CONTROL VOLTAGE | INPUT LEVEL | AGC CONTROL VOLTAGE | INPUT LEVEL | AGC CONTROL VOLTAGE | INPUT LEVEL | AGC CONTROL VOLTAGE | INPUT LEVEL |
|---|---|---|---|---|---|---|---|
| 73 | -48.5 | 124 | -64.2 | 175 | -79.5 | 226 | -94.3 |
| 74 | -49.0 | 125 | -64.5 | 176 | -79.6 | 227 | -94.5 |
| 75 | -49.2 | 126 | -64.8 | 177 | -79.8 | 228 | -94.7 |
| 76 | -49.5 | 127 | -65.2 | 178 | -80.0 | 229 | -95.0 |
| 77 | -50.0 | 128 | -65.5 | 179 | -80.5 | 230 | -95.2 |
| 78 | -50.2 | 129 | -65.7 | 180 | -80.7 | 231 | -95.5 |
| 79 | -50.5 | 130 | -66.0 | 181 | -81.0 | 232 | -95.7 |
| 80 | -51.0 | 131 | -66.2 | 182 | -81.2 | 233 | -96.0 |
| 81 | -51.2 | 132 | -66.5 | 183 | -81.5 | 234 | -96.2 |
| 82 | -51.5 | 133 | -66.7 | 184 | -81.7 | 235 | -96.5 |
| 83 | -51.7 | 134 | -67.0 | 185 | -82.0 | 236 | -97.0 |
| 84 | -52.0 | 135 | -67.2 | 186 | -82.5 | 237 | -97.2 |
| 85 | -52.2 | 136 | -67.5 | 187 | -82.7 | 238 | -97.5 |
| 86 | -52.5 | 137 | -67.7 | 188 | -83.0 | 239 | -97.7 |
| 87 | -52.7 | 138 | -68.0 | 189 | -83.2 | 240 | -98.0 |
| 88 | -53.0 | 139 | -68.2 | 190 | -83.5 | 241 | -98.2 |
| 89 | -53.5 | 140 | -68.5 | 191 | -84.0 | 242 | -98.5 |
| 90 | -53.7 | 141 | -68.7 | 192 | -84.2 | 243 | -98.7 |
| 91 | -54.0 | 142 | -69.0 | 193 | -84.5 | 244 | -99.0 |
| 92 | -54.2 | 143 | -69.5 | 194 | -85.0 | 245 | -99.2 |
| 93 | -54.5 | 144 | -69.7 | 195 | -85.2 | 246 | -99.5 |
| 94 | -54.7 | 145 | -70.0 | 196 | -85.5 | 247 | -99.6 |
| 95 | -55.0 | 146 | -70.5 | 197 | -86.0 | 248 | -99.8 |
| 96 | -55.2 | 147 | -70.7 | 198 | -86.2 | 249 | -100.0 |
| 97 | -55.5 | 148 | -71.0 | 199 | -86.5 | | |

| | |
|---|---|
| MAXIMUM OF IF DETECTION VOLTAGE | 102 |
| AVERAGE OF IF DETECTION VOLTAGE | 100 |
| MINIMUM OF IF DETECTION VOLTAGE | 95 |

FIG. 6

SELF-DIAGNOSTIC METHOD FOR DETECTING FAULTS IN A TRANSCEIVER WITHIN A WIRELESS RECEIVING UNIT OF A BASE TRANSCEIVER STATION

CLAIM OF PRIORITY

This application makes reference to, incorporates the same herein, and claims all benefits accruing under 35 U.S.C. §119 arising from an application entitled, A METHOD AND AN APPARATUS FOR FAULT DIAGNOSTIC OF TRANSCEIVER IN BASE STATION, earlier filed in the Korean Industrial Property Office on Jun. 15, 1998, and there duly assigned Serial No. 1998-22291.

FIELD OF THE INVENTION

The present invention relates to a self-diagnosis system for detecting faults in a transceiver within a wireless receiving unit of a base transceiver station. More specifically, the present invention relates to a self-diagnostic method for diagnosing and detecting faults in an internal circuit of the transceiver unit in a radio base transceiver system (BTS) and an apparatus thereof.

DESCRIPTION OF THE PRIOR ART

In a mobile communication system, namely, in a conventional code division multiple access (CDMA) system, the system is provided with a plurality of mobile stations, a plurality of base transceiver systems (BTSs) for providing communication service to the mobile stations, a base station controller (BSC) for connecting the BTSs with a mobile switching center (MSC), and the MSC for connecting the BSC to a public switched telephone network (PSTN).

FIG. 1 is a block diagram which illustrates a radio frequency (RF) receive path of a typical CDMA cellular BTS. The BTS includes an out-door system 1 for receiving a radio frequency (RF) signal from mobile stations, and an in-door system 2 for processing the received signal.

The in-door system 2 includes a RF unit (RFU) 3 for converting the received RF signal into an intermediate frequency (IF), a digital unit (DU) 4 for demodulating the RFU transmitted signal into a digital signal, and a base station test unit (BTU) 5 coupled to the RFU for testing the BTS.

The RFU 3 includes a front-end unit (REU) 3a coupled to a receiving antenna, a transceiver unit (XCVU) 3b for down converting the received signal into an IF and for outputting the IF at a regular level, and an IF amplifier/divider 3c for transmitting the converted IF signal to the digital unit (DU) 4.

The digital unit (DU) 4 includes a digital signaling unit 4a for demodulating the received signal from the IF amplifier/divider 3c. The BTU 5 includes a RF switch 5a coupled to the front-end unit (FEU) 3a, a variable attenuator 5b for regulating an attenuation value of the signal which is transmitted to the RF switch 5a, and a test mobile (TM) 5c, coupled to the variable attenuator 5b, for providing a test signal.

In the above base transceiver system of a mobile communication system, the base station test unit (BTU) 5 is used to detect for any fault in the receive path when the fault occurs.

FIG. 2 is a flow chart which illustrates a prior method for checking a fault of a receive path of a BTS. In the prior diagnostic method, a fault diagnostic apparatus ascertains a call being currently communicated in a BTS (step 101). If a call were ongoing, the fault diagnosis is terminated since a fault diagnosis can't be performed during the call being communicated. (step 102). When no call is currently being communicated, the output level of the test unit 5c is properly adjusted and is provided to the transceiver unit 3b via a front-end unit 3a (step 103). The fault diagnosis apparatus remembers the provided output level of the test unit 5c (step 104).

The diagnostic apparatus for detecting faults reads the received input signal level measured by the transceiver unit 3b (step 105), and then compares the received input signal level with the remembered output signal of the test unit 5c (step 106), in order to determine whether the difference of these two signals exceeds a predetermined value of 10 dB (step 107). If the difference exceeds 10 dB, it is determined that a fault exists in the receive path. Thereafter, the diagnosis apparatus reads an IF level outputted from the transceiver unit 3b (step 108) and compares the read IF level with the IF level which was previously saved in an inner memory of the transceiver unit 3b (step 109). If these two compared IF levels are different, it is determined that a fault exists in the transceiver unit 3b (step 110), and if not, it is determined that a fault exists in the front-end unit 3a.

However, if the difference does not exceed 10 dB in step 106, the diagnostic apparatus ascertains as to whether an alarm is reported in the output of the transceiver unit 3b (step 112). If an alarm is reported, it is determined that a fault exists in the IF amplifier/divider 3c, otherwise, it is determined that no fault exists in the receive path of the BTS and all diagnostic procedures are terminated.

As illustrated in the above, the prior known technique uses a base station test unit (BTU) for checking functions of a RF unit. However, the problem with the prior method is that an extra device, for example a BTU, is required for detecting any fault in the system, and moreover, it takes a long time to detect such fault due to very long and complicated diagnostic method. Also, the prior method is not applicable for detecting faults in an internal circuit of the transceiver unit, but only limited to detect faults in a RF unit.

U.S. Pat. No. 5,640,401 entitled, "Communication Circuit Fault Detector," discloses a communication detector for testing a communication circuit. The communication circuit fault detector generates a test signal and inputs the test signal to the communication circuit to compare the original test signal with the returned test signal outputted from the communication circuit. However, since such fault detector is directed only to detect for a fault in a typical data communication circuit, it is not possible to detect for a fault in an inner circuit of a transceiver unit of a BTS.

SUMMARY OF THE INVENTION

One object of the present invention to provide a self-diagnosis system of a transceiver unit for detecting faults in its internal circuit by measuring an auto gain controller control voltage value and an IF detection voltage value of a down converter, and thereafter by comparing to a reference value.

Other objects and advantages will be more easily understood by the following detailed description and accompanying drawings.

It is another object of the present invention to provide a wireless receiving unit of a base transceiver station comprising a down converter and a transceiver slave control board, wherein the down converter includes an amplifier for amplifying a received signal, an automatic gain controller (AGC) for controlling a signal level of the amplified received signal, an AGC detector for detecting an intermediate frequency (IF) detection voltage value and for determining the AGC control voltage value, a transceiver slave control board, which includes an analog to digital converter for converting the IF detection voltage value from the down converter and for converting the AGC control voltage value into digital value, an EEPROM for storing predetermined reference values, a look up table for converting the AGC control voltage values into the received input signal levels, and a maximum, minimum and average IF detection voltage values responsive to changes of the received input signal.

Another object of the present invention is to provide a self-diagnostic method for detecting faults in a transceiver comprising the steps of reading a predetermined first minimum value of received input signal level and a predetermined first maximum value of received input signal level applied to the wireless receiving unit, reading an instantaneous control voltage value of the AGC, converting the instantaneous control voltage value into a received input signal level in accordance with the look up table, and determining that a fault exists in the amplifier operation of the down converter when the converted received input signal is below the predetermined first minimum value of the received input signal level and determining that a fault exists in the amplifier operation of the down converter when the converted received input signal exceeds the predetermined first maximum value of the received input signal level, reading a predetermined second minimum value of the intermediate frequency (IF) detection voltage value and a predetermined second maximum value of the intermediate frequency (IF) detection voltage value when the converted received input signal level stays between the predetermined first minimum value and the predetermined first maximum value of the received input signal levels, reading an instantaneous IF detection voltage value which is measured by the AGC detector and determining that a fault exists in the AGC operation of the down converter when the instantaneous IF detection voltage value is below the predetermined second minimum value of IF detection voltage value and determining that a fault exists in the AGC operation of the down converter when the instantaneous IF detection voltage value exceeds the predetermined second maximum value of IF detection voltage value.

It is further object of the present invention to provide a self-diagnostic apparatus for detecting faults in a transceiver within a wireless receiving unit of a base transceiver station comprising a down converter having an amplifier for amplifying the received input signal, an automatic gain controller (AGC) for regulating the level of the amplified received input signal, an AGC detector for detecting an instantaneous intermediate frequency (IF) detection voltage value and for determining an instantaneous AGC control voltage value, and a transceiver slave control board having a microprocessor, an analog to digital converter for converting the instantaneous IF detection voltage value and the instantaneous AGC control voltage value into digital values, and a memory device for converting the instantaneous AGC control voltage value into corresponding received input signal level and for storing predetermined reference values and a maximum, minimum and average value of IF signal detection voltage value in accordance with changes of the received input signals, wherein the microprocessor compares the instantaneous AGC control voltage value provided by the down converter with a predetermined first minimum value and a predetermined first maximum value of the received input signal levels, respectively, for determining that a fault exists in the amplifying operation of the down converter when the converted received input signal level of the instantaneous AGC control voltage value is below the predetermined first minimum value of the received input signal level or exceeds the predetermined first maximum value of the received input signal level, and thereafter, if the converted received input signal level stays between the range of the predetermined first minimum value and predetermined first maximum value of the received input signal levels, compares the instantaneous IF detection voltage value provided by the down converter with the predetermined second minimum value and a predetermined second maximum value of the IF detection voltage value, respectively, for determining that the down converter's AGC operation is faulty when the instantaneous IF detection voltage value is below the second minimum value of the IF detection voltage value or exceeds the predetermined second maximum value of the IF detection voltage value.

BRIEF DESCRIPTION OF THE DRAWINGS

FIG. 5 is illustrates an exemplary conversion table representing auto gain controller control voltages and received input signal levels.

FIG. 6 illustrates an IF detection voltage value responsive to change of the received input signal.

DETAILED DESCRIPTION OF THE INVENTION

Figure 1:
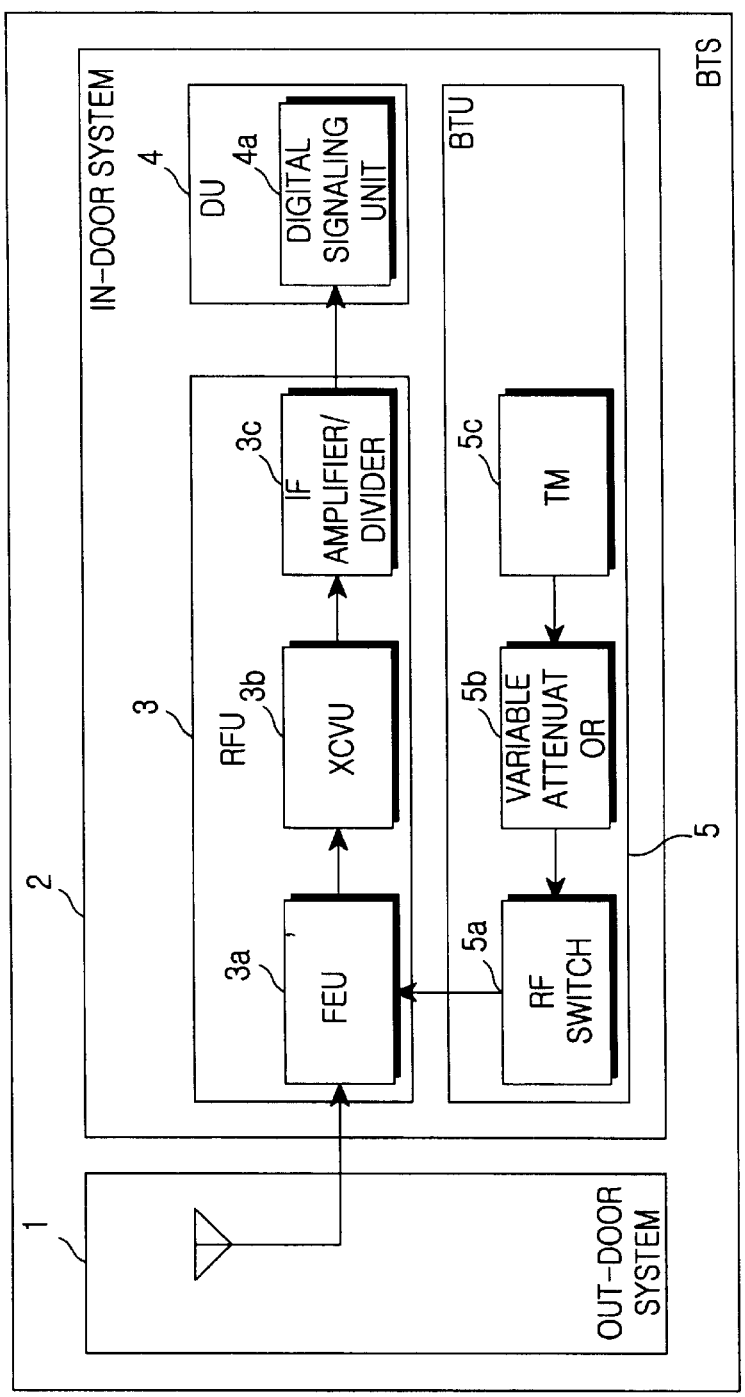
FIG. 1 is a block diagram for illustrating a RF receive path of a typical CDMA cellular BTS.
Figure 1:
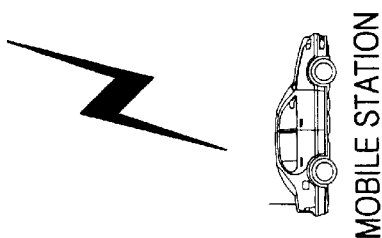
Figure 2:
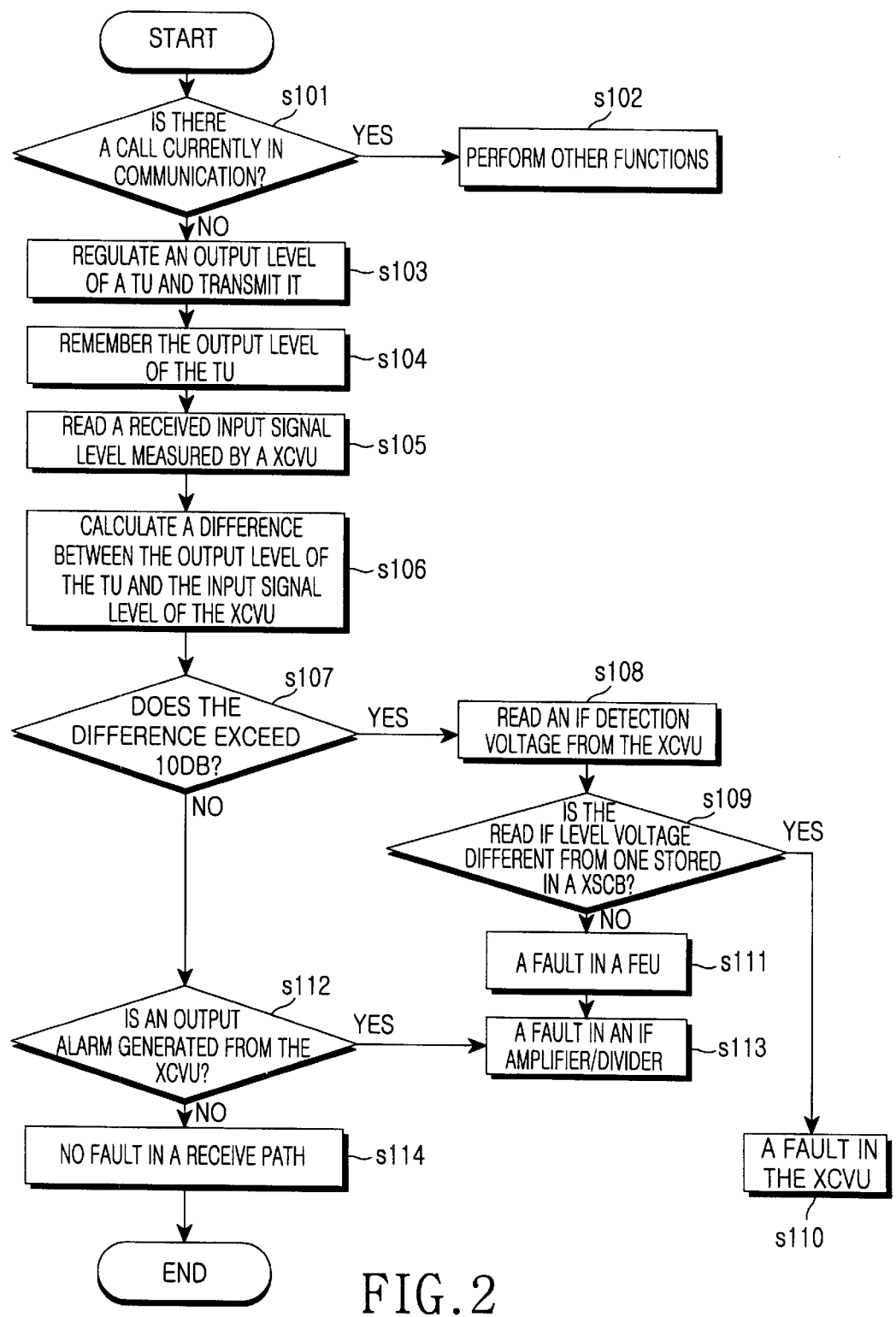
FIG. 2 is a flow chart for illustrating a prior known method for fault diagnosis of a receive path of a BTS.

In accordance with one embodiment of the present invention, a self-diagnostic method for detecting faults in a transceiver within a wireless receiving unit of a base transceiver station comprising a down converter 10 and a transceiver slave control board 20, wherein the down converter includes an amplifier 11 for amplifying the received input signal, an automatic gain controller 15 (AGC) for controlling a signal level, an AGC detector 16 for detecting an instantaneous intermediate frequency (IF) detection voltage value and for determining an instantaneous AGC control voltage value, and wherein the transceiver slave control board further includes an analog to digital converter 22 for converting the instantaneous IF detection voltage value and instantaneous the AGC control voltage value into digital values, and an EEPROM 23 for storing a predetermined first minimum and predetermined first maximum value of received input signal levels, a predetermined second minimum and a predetermined is second maximum of IF detection voltage values, a look up table for converting the instantaneous AGC control voltage value into the a received input signal level, and a maximum, minimum and average IF detection voltage values in response to changes of the received input signals.

Another embodiment of the present invention is to provide a method for detecting faults in a transceiver comprising the steps of, reading a predetermined first minimum value and a predetermined first maximum value of the received input signal level applied to the wireless receiving unit, wherein the predetermined first minimum and the predetermined first maximum values are set by an operator of the system during the designing process for the hardware of the down converter in accordance with a dynamic range of a signal flowing into the down converter, reading an instantaneous control voltage value of the AGC, and converting the instantaneous control voltage value into a received input signal level by looking up a conversion table, determining that a fault exists in the amplifier operation of the down converter when converted received input signal level is below a predetermined first minimum value, determining that a fault has occurred in the amplifier operation of the down converter when the converted received input signal level exceeds the predetermined first maximum value of received input signal level, and thereafter, if the converted received input signal level stays between the predetermined first minimum and predetermined first maximum value, reading a predetermined second minimum value and a predetermined second maximum value of the intermediate frequency (IF) detection voltage value, reading an instantaneous IF detection voltage value which is measured by the AGC detector 16, determining that a fault exists in the AGC operation of the down converter when the instantaneous IF detection voltage value is below the predetermined second minimum value of the IF detection voltage value, and determining that a fault exists in the AGC operation of the down converter when the instantaneous IF detection voltage value exceeds the predetermined second maximum value of the IF detection voltage value.

Preferably, value units of the received input signal level of the AGC control voltage values stored in the EEPROM are dBM.

Preferably, the EEPROM stores a maximum IF detection voltage value, a minimum IF detection voltage value and an average IF detection voltage value, which are measured by testing process accordingly to a plurality of received input signals. The predetermined second minimum and predetermined second maximum value of the IF detection voltage values are determined by a calibration process based on the measured maximum, minimum and average IF detection voltage values stored in the EEPROM.

Preferably, the method is periodically executed for a predetermined time.

Preferably, the AGC detector 16 adjusts the AGC gain by detecting the IF detection voltage value, and determines the AGC control value from this detected IF detection voltage value.

In accordance with another embodiment of the present invention, a self-diagnostic apparatus for detecting faults in a transceiver within a wireless receiving unit of a base transceiver station comprising a down converter 10 includes an amplifier 11 for amplifying the received input signal, an automatic gain controller 15 (AGC) for controlling a signal level of the amplified received input signal, an AGC detector 16 for detecting an instantaneous intermediate frequency (IF) detection voltage value and for determining the AGC control voltage value, a transceiver slave control board 20 including a microprocessor 21, an analog to digital converter 23 for converting the IF detection voltage value from the down converter and the AGC control voltage value into digital values, a memory device for storing a predetermined first maximum and a predetermined first minimum values of received input signal levels, a predetermined second maximum and a predetermined second minimum values of the IF detection voltage values and for storing a look up table for converting digitally converted instantaneous AGC control voltage value into more easily detectable, received input signal levels, since the AGC control voltage value is difficult to detect, wherein the microprocessor compares the instantaneous AGC control voltage value provided by the own converter with a predetermined first minimum value and a predetermined first maximum value of the received input signal levels for determining that a fault exists in he amplifying operation of the down converter when the AGC control voltage value is below the predetermined first minimum value of the received input signal level or exceeds the predetermined first maximum value of the received input signal level, and thereafter, if the converted received input signal level stays between the predetermined first minimum and predetermined first maximum value, compares the instantaneous IF detection voltage value provided by the down converter with a predetermined second minimum value and a predetermined second maximum value of the IF detection voltage values, respectively, for determining that a fault exists in the AGC operation of the down converter when the instantaneous IF detection voltage value is below the predetermined second minimum value or exceeds the predetermined second maximum value of IF detection voltage values.

Preferably, the microprocessor 21 periodically executes the operations of comparison for checking the system.

Preferably, the memory device 23 is implemented by an electrical erasable programmable read only memory (EEFROM).

Preferably, the memory device 23 stores a conversion table for converting the instantaneous AGC control voltage value into a more detectable value, a received input signal level.

Preferably, the units of the received input signal level of the conversion table are dBm.

Preferably, the memory device 23 stores a maximum, a minimum and an average IF detection voltage value which are pre-measured by a test process according to changes of received input signals.

Preferably, the predetermined first minimum value and predetermined first maximum value of a received input signal levels are predetermined by an operator in accordance with a dynamic change of input signals flowing into the down converter. That is, it is determined based on the operation range of a received input signal to which the transceiver accepts.

Preferably, the predetermined second minimum value and predetermined maximum value of an IF detection voltage values are determined by a calibration process based on the measured maximum, minimum and average IF detection voltage values that are stored in the EEPROM.

Preferably, the analog-to-digital converter converts an AGC control voltage value transmitted from the down converter into 8 bits digital value, and consequently, the conversion result the AGC control voltage value corresponds to one value in the range from 0 to 255.

Figure 3:
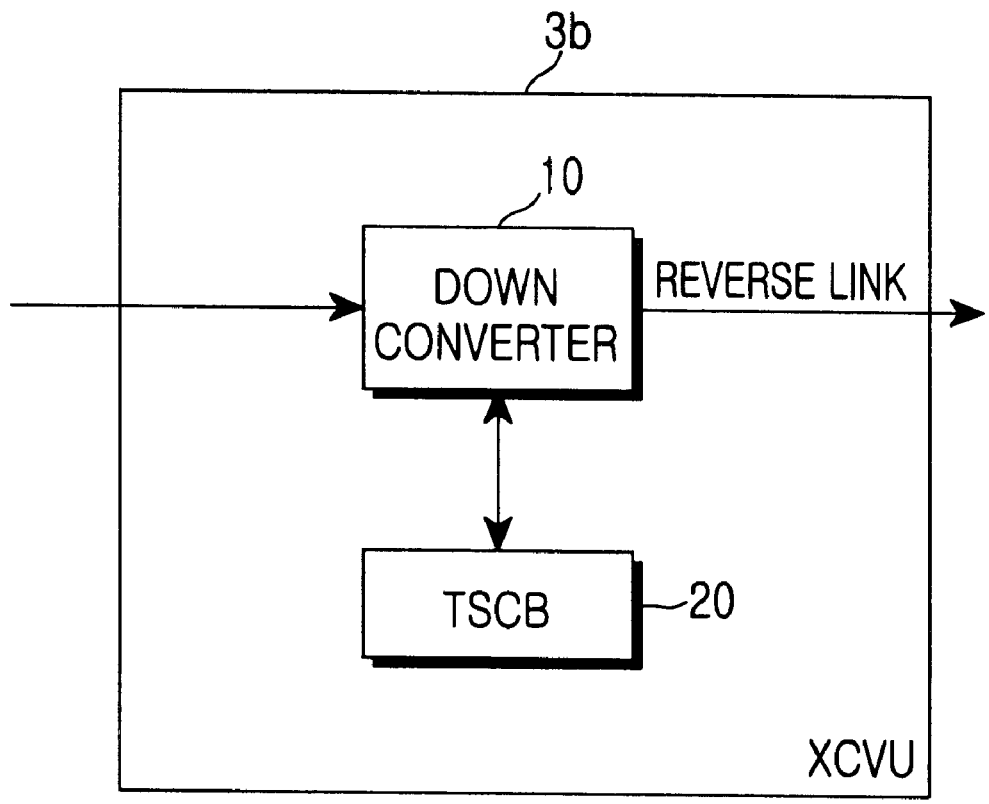
FIG. 3 is a block diagram for illustrating a receive path of a transceiver unit.

The present invention provides a method and apparatus for self-diagnosing for detecting a fault in an internal circuit of a transceiver unit. FIG. 3 is a block diagram for illustrating a receive path of a transceiver unit. As illustrated, the receive path includes a down converter 10 for converting a received RF signal into an IF signal, and a transceiver slave control board 20 for controlling the down converter 10.

The present invention determines whether a fault exists in the down converter 10 by periodically comparing an instantaneous auto gain controller (AGC) control voltage value and an instantaneous IF detection voltage value with predetermined refrence values, respectively.

Figure 4:
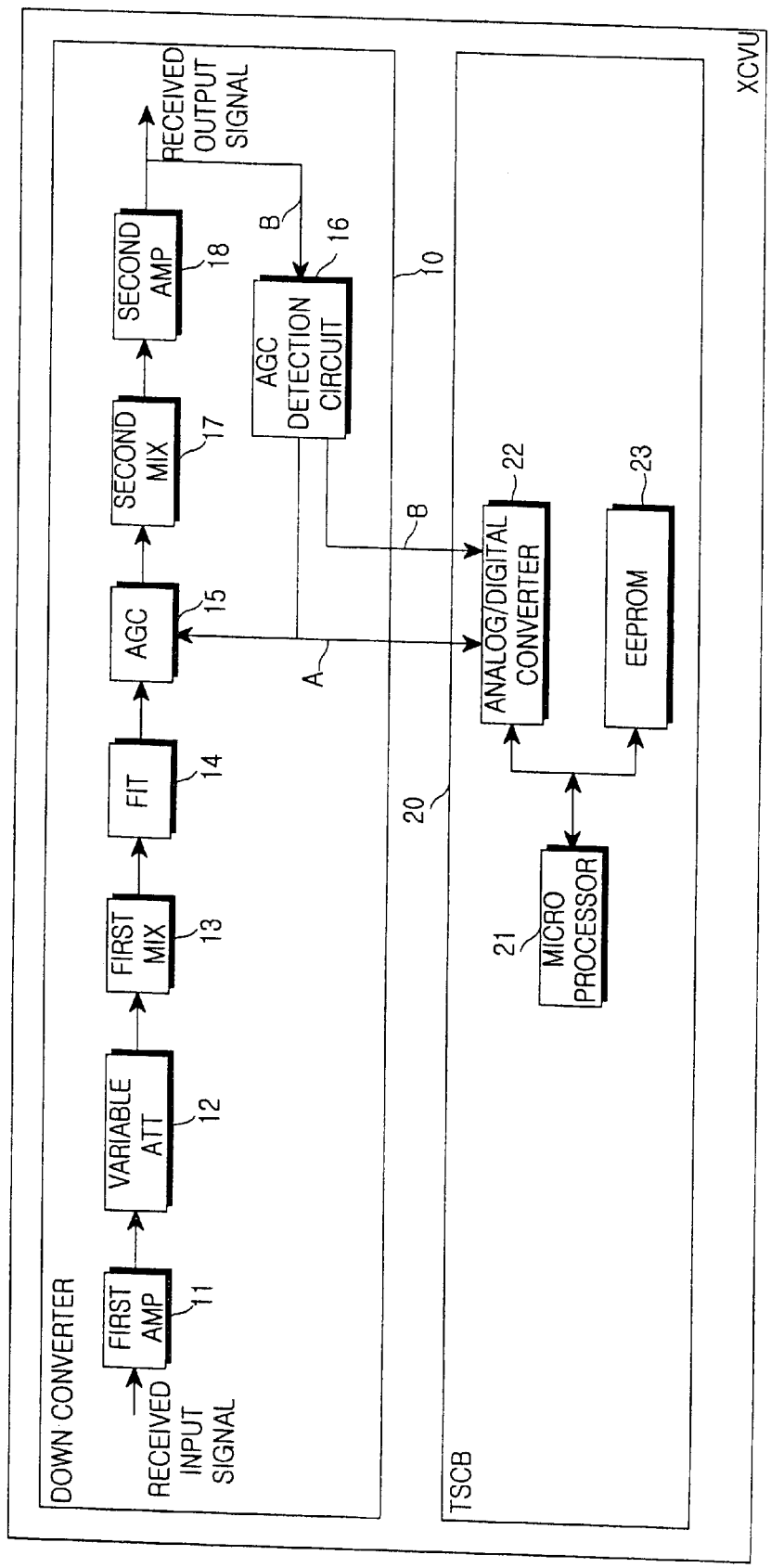
FIG. 4 is a block diagram for illustrating a down converter and transceiver slave control board of the present invention.

FIG. 4 is a block diagram for illustrating a down converter 10 and a transceiver slave control board 20 to which the present invention is applicable. The down converter 10 comprising a first amplifier 11 for amplifying a received signal, a variable attenuator 12 for adjusting the amplified signal level, a first mixer 13 for converting the level-adjusted RF signal into an appropriate frequency, a band pass filter 14 for removing an unwanted signal from the converted signal, an auto gain controller (AGC) 15 for regulating the filtered signal level, a second mixer 17 for converting the level-regulated signal into an intermediate frequency (IF), a second amplifier 18 for amplifying the converted signal and for outputting an IF detection voltage signal, and an auto gain control/detector 16 for detecting the IF detection voltage value finally outputted from the down converter 10 and for determining the AGC control voltage value.

The transceiver slave control board 20 comprising a microprocessor 21 for controlling a transceiver unit and for comparing values, an analog to digital converter 22 for receiving an AGC control voltage value and an IF detection voltage value from the down converter 10 and for converting these received values into digital values, and a memory means for storing reference values to be compared with the AGC control voltage value and the IF detection voltage value. The memory means is implemented with an electrical erasable programmable read only memory (EEFROM).

As stated above, the down converter 10 regulates an output signal level using the AGC 15. The AGC 15 amplifies the input signal with a random gain when the input signal strength is within its own operation range, and outputs an amplified signal. The AGC detector 16 measures an IE detection voltage value, B, which is a final output of the down converter, reads a comparison result of the measured voltage value with a reference value, and detects an AGC control voltage value A in order to control an AGC gain. Accordingly, the operation of the AGC 15 and AGC detector 16 provides the down converter 10 to maintain a regular level of an output signal. Thus, the IF detection voltage value, which is a final output signal from the down converter, can be maintained regularly and stays within a regular range despite of a change in the input signal strength.

In the present invention, the AGC control voltage value A, which controls the AGC, and the IF detection voltage value B, which is a final output of a down converter, are compared with reference values, respectively. Such a comparison is performed by a microprocessor 21 in a transceiver slave control board 20. The AGC control voltage value A and the IF detection voltage value B are converted into digital values via an analog to digital converter 22, which converts the two voltage values into 8 bits digital. These two values are converted into digital value ranging from 0 to 255, respectively. Then, the microprocessor 21 obtains respective comparison value from a conversion table stored in a EEFROM 23 for the digitally converted AGC control voltage value and the IF detection voltage value, and thereafter, compares the corresponding comparison value with a predetermined reference value stored in a EEFROM 23 for detecting faults in the operation of the down converter 10. An example of a change in the IF detection voltage responsive to a change of an input signal is shown in FIG. 6. As shown, the EEFROM 23 stores a maximum, a minimum and an average IF detection voltage value of the AGC 15.

The AGC control voltage value is used to determine whether a fault exists in the amplifier operation of the down converter 10 and is variable according to a different input signal strength supplied to the down converter 10. Similarly, the IF detection voltage value is used to determine whether a fault exists in the AGC operation of the down converter.

FIG. 5 illustrates an example of conversion table, which includes the AGC control voltages and received input signal levels, stored in an EEFROM 23 of a transceiver slave control board 20. The AGC control voltages, which are limited to those within the operation range of the AGC, are indicated as digital value from 0 to 255, and the unit of the received input signal level is dBm. Each received input signal level versus a AGC control voltage as shown in FIG. 3 is stored in an EEFROM 23 of a transceiver slave control board 20.

A transceiver unit converts the measured AGC control voltage with corresponding received input signal level, as shown in FIG. 5. The reference values of the predetermined first maximum and predetermined first minimum of received input signal levels are firstly measured based on the operation range of a transceiver unit on the received input signal. That is, they are set by an operator of the system during the hardware design process of the down converter. The reference value for the predetermined second maximum and predetermined second minimum value of IF detection voltages values are determined by a calibration process based on the measured maximum, minimum and average IF detection voltage values stored in the EEFROM 23.

Also, the present invention can be designed to set a specific period of time on diagnosing the transceiver unit, so that a fault diagnosis of a transceiver unit is performed periodically by comparing the AGC control voltage and the IF detection voltage value with these reference values, respectively.

When a fault occurs in the amplifier operation of a down converter, a received input signal level which is transmitted from an AGC of a down converter deviates from the predetermined first maximum and minimum values. When a fault occurs in the AGC operation, an IF detection voltage deviates from the predetermined second maximum and minimum values. Accordingly, faults in either the amplifier or the AGC of the down converter are determined by comparing to predetermined reference values.

Figure 7:
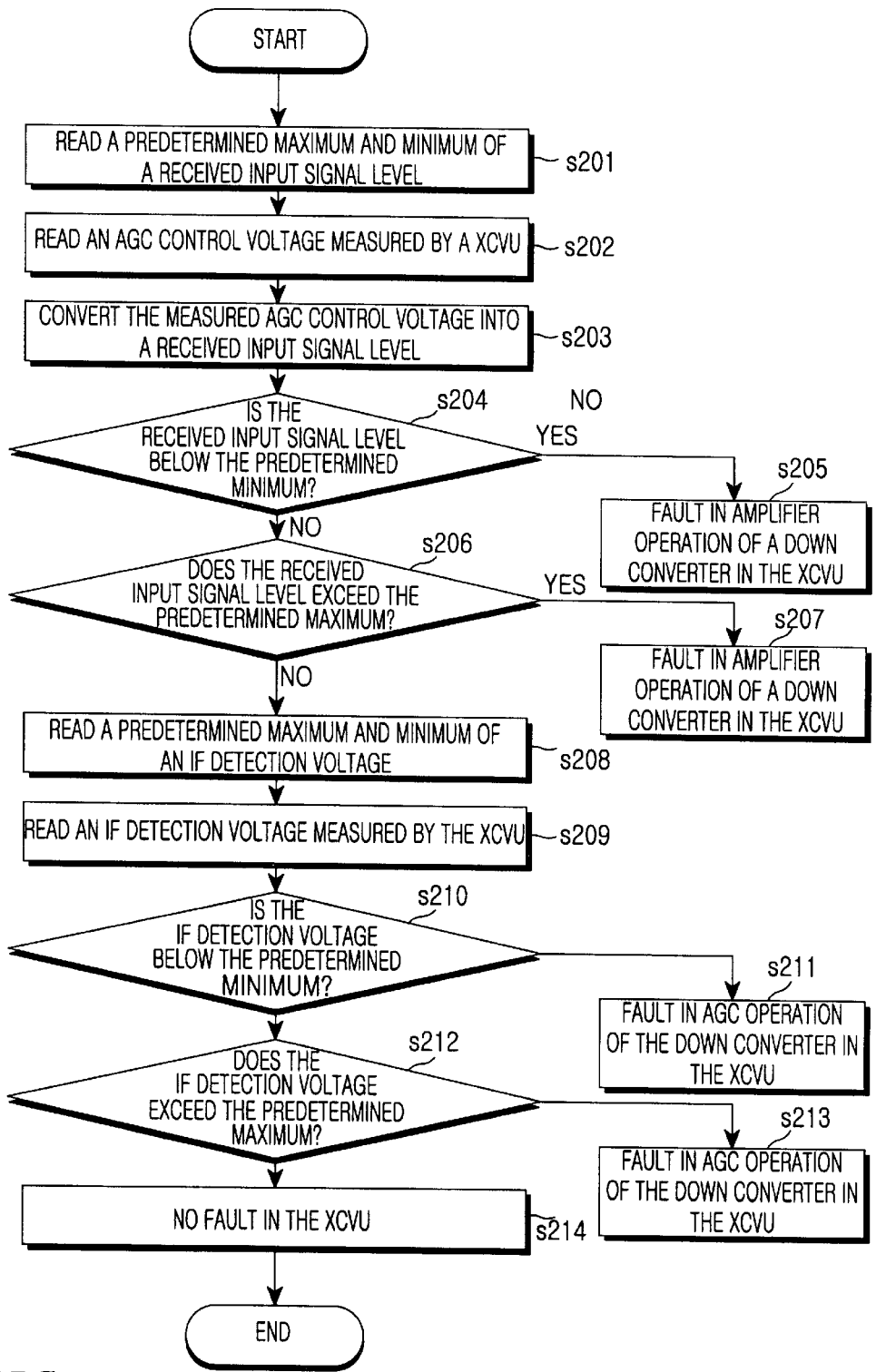
FIG. 7 is a flow chart for illustrating a self-diagnostic method for diagnosing a transceiver unit in accordance with the present invention.

FIG. 7 is a flow chart for illustrating a method for detecting a fault in a transceiver unit in accordance with the present invention. A predetermined first maximum and predetermined first minimum of received input signal levels stored in an EEFROM 23 are read (step 201). An instantaneous AGC control voltage generated by an auto gain controller (AGC) 15 of a transceiver unit is read (step 202). The instantaneous control voltage is measured by an AGC detector 16, and thereafter transmitted to a transceiver slave control board 20. The measured AGC control voltage is digitally converted and a corresponding received input signal level is retrieved (step 203) from with a conversion table stored in the EEFROM 23 which converts the control voltages into corresponding received input signal level.

A microprocessor 21, in the transceiver slave control board 20, determines as to whether the converted received input signal level is below a predetermined first minimum signal level (step 204). When the converted received input signal level is below the predetermined first minimum signal level, the microprocessor 21 determines that a fault occurs in the amplifier operation of a down converter 10 (step 205). Similarly, the microprocessor 21 determines for whether the converted received input signal level exceeds a predetermined first maximum signal level (step 206), and when the converted input signal level exceeds the predetermined first maximum signal level, the microprocessor 21 determines that a fault exists in the amplifier operation of a down converter 10 (step 207).

However, when the converted received input signal level stays within the predetermined first maximum and predetermined first minimum signal levels, the microprocessor then reads a predetermined second maximum and a predetermined second minimum of an IF detection voltage values stored in the EEFROM 23 (step 208) and reads an instantaneous IF detection voltage measured by an AGC 15 of the transceiver unit.

The microprocessor determines for whether the measured instantaneous IF detection voltage is below a predetermined second minimum value (step 210), and when the measured instantaneous IF detection voltage is below the predetermined second minimum value, it is determined that a fault exists in the AGC operation of a down converter (step 211). Also, when the measured instantaneous IF detection voltage exceeds a predetermined second maximum value, the microprocessor determines that a fault exists in the AGC operation of a down converter (step 213).

The present invention detects for whether faults exists in the operation of a down converter in a transceiver unit by comparing an instantaneous AGC control voltage data and an instantaneous IF detection voltage data generated from the down converter with predetermined reference values stored in the memory means.

In summary, the present invention is operable to manage a down converter more easily. Although illustrative embodiments of the present invention have been described herein with reference to the accompanying drawings, it is to be understood that the invention is not limited to those precise embodiments, and that various other changes and modifications may be affected therein by one skilled in the art without departing from the scope or spirit of the invention. All such changes and modifications are intended to be included within the scope of the invention as defined by the appended claims.

What is claimed is:

1. A self-diagnostic method for detecting faults in a transceiver within a wireless receiving unit of a base transceiver station of the type having a down converter and a transceiver slave control board, an amplifier in the down converter for amplifying a received input signal, an automatic gain controller (AGC) for controlling a signal level from the amplified received input signal, an AGC detector for detecting an instantaneous intermediate frequency (IF) detection voltage value and for determining an instantaneous control voltage value generated by the AGC, a transceiver slave control board including an analog to digital converter for converting the instantaneous IF detection voltage value from the down converter and the AGC control voltage value into digital value, and an EEPROM for storing a look up table for converting the instantaneous AGC control voltage values into a received input signal levels, a predetermined first minimum and a predetermined maximum values of the received input signal levels, a predetermined second minimum and a predetermined second maximum values of the IF signal detection voltage values, and the instantaneous IF signal detection voltage value responsive to change of the received input signal, the said comprising the steps of:

reading the predetermined first minimum value of the received input signal level and the predetermined first maximum value of a received input signal level stored in said EEPROM;

reading the instantaneous control voltage value generated by the AGC;

converting the instantaneous control voltage value into the received input signal level;

comparing the converted received input signal level with the predetermined first minimum value of the received input signal level and the predetermined first minimum value of the received input signal level for determining that a fault exists in amplifier operation of the down converter when the converted received input signal level falls outside of the range between the predetermined first maximum value of the received input signal level and the predetermined first minimum value of the received input signal level;

reading the predetermined second minimum value of the intermediate frequency (IF) detection voltage value and the predetermined second maximum value of the intermediate frequency (IF) detection voltage value when the converted received input signal stays between the predetermined first minimum value of the received input signal level and the predetermined first maximum value of the received input signal level;

reading the instantaneous IF detection voltage value determined by the AGC detector; and, comparing the instantaneous IF detection voltage value with the predetermined second minimum value of the IF detection voltage value and the predetermined second maximum value of the IF detection voltage value and detecting faults in the AGC operation of the down converter when the instantaneous IF detection voltage value falls outside of the range between the predetermined second minimum of the IF detection voltage value and predetermined second maximum value of the IF detection voltage value.

2. The method as set forth in claim 1, wherein the predetermined first minimum value of the received input signal level and the predetermined first maximum value of the received input signal level are pre-stored in the EEPROM based on the operating range of the received input signal received by the transceiver.

3. The method as set forth in claim 2, wherein the value units of the received input signal level of the AGC control voltage value stored in the EEPROM are dBM.

4. The method as set forth in claim 3, a maximum IF detection voltage value, a minimum IF detection voltage value, and an average IF detection voltage value responsive to changes of the received input signal are pre-stored in the EEPROM.

5. The method as set forth in claim 4, wherein the predetermined second minimum value and the predetermined second maximum value are determined by a calibration process based on the measured maximum, minimum, and average IF detection voltage value stored in the EEPROM.

6. The method as set forth in claim 1 or 5, wherein said method periodically executes the operation of comparison and determination at predetermined time at said interval.

7. The method as set forth in claim 1, including further step of adjusting the AGC gain by detecting the IF detection voltage value and by determining the AGC control value from the detected IF detection voltage value.

8. A self-diagnostic apparatus for detecting a fault in a transceiver within a wireless receiving unit of a base transceiver station, said apparatus comprising:

a down converter having an amplifier for amplifying a received input signal, an automatic gain controller (AGC) for regulating the signal level from the amplified received input signal, and an AGC detector for detecting an instantaneous intermediate frequency (IF) detection voltage value and for determining an instantaneous AGC control voltage value, and a transceiver slave control board having a microprocessor, an analog to digital converter for converting the IF detection voltage value from a down converter and the AGC control voltage value into digital value, and a memory device for storing a predetermined first minimum value of the received input signal level, a predetermined first minimum value of the received input signal levels, a predetermined second minimum of the IF detection voltage value, a predetermined second minimum of the IF detection voltage value, and a look up table for converting the instantaneous AGC control voltage value into a received input signal level;

wherein the microprocessor compares the converted received input signal level provided by the down converter with the predetermined first minimum value of the received input signal level and the predetermined first maximum value of the received input signal level, respectively, for determining that fault exists in amplifying operation of the down converter, when the converted received input signal level falls outside of the range between the predetermined first minimum value and the predetermined first maximum value of the received input signal level, and if the converted received input signal level falls within the range of the predetermined first minimum and predetermined second maximum values of the received input signal levels, compares the instantaneous IF detection voltage value provided by the down converter with the predetermined second minimum value of the IF detection voltage value and predetermined second maximum value of the IF detection voltage value, respectively, for determining that fault exists in the amplifying operation of the down converter, when the instantaneous IF detection voltage value falls outside of the range between the predetermined second minimum and the predetermined second maximum value of the IF detection voltage value.

9. The apparatus as set forth in claim 8, wherein the microprocessor periodically executes the operations of comparison and determination.

10. The apparatus as set forth in claim 9, wherein the memory device includes an electrical erasable programmable read only memory (EEFROM).

11. The apparatus as set forth in claim 10, wherein the memory device includes a look up table for converting the instantaneous AGC control voltage value into the received input signal level.

12. The apparatus as set forth in claim 11, wherein the value units of the received input signal level of the conversion table are dBm.

13. The apparatus as set forth in claim 10, wherein the memory device stores a maximum, a minimum and an average of the IF detection voltage value which are measured by a test process according to changes in the received input signal.

14. The apparatus as set forth in claim 13, wherein the predetermined second minimum value of the IF detection voltage value and the predetermined second maximum value of the IF detection voltage value are determined by a calibration process based on the measured maximum, minimum and average IF detection voltage values stored at the EEPROM.

15. The apparatus as set forth in claim 13, wherein the predetermined first minimum value of the received input signal level and the predetermined first maximum value of the received input signal level are pre-set based on operation range of the received input signal received by the transceiver.

16. The apparatus as set forth in claim 8, wherein the analog-to-digital converter converts an AGC control voltage value transmitted from the down converter into 8 bits digital value, which results in the AGC control voltage value corresponding to one of 0 to 255.

17. The apparatus as set forth in claim 8, the down converter further comprising:
   a variable attenuator for adjusting the amplified received input signal from the amplifier;
   a first mixer for converting the adjusted received input signal in to an appropriate frequency;
   a band pass filter for removing unwanted signals from the output signals from the first mixer;
   a second mixer for converting the level-regulated output signal from the automatic gain controller (AGC) into an intermediate frequency(IF); and,
   a second amplifier for amplifying the converted output signal from the second mixer and for outputting an IF detection voltage signal.

18. The apparatus as set forth in claim 14, wherein the analog-to-digital converter converts an AGC control voltage value transmitted from the down converter into 8 bits digital value, which results in the AGC control voltage value corresponding to one of 0 to 255.

19. The apparatus as set forth in claim 15, wherein the analog-to-digital converter converts an AGC control voltage value transmitted from the down converter into 8 bits digital value, which results in the AGC control voltage value corresponding to one of 0 to 255.

* * * * *